R. A. GRAHAM.
Plow.
No 10,069.
Patented Oct. 4, 1853.
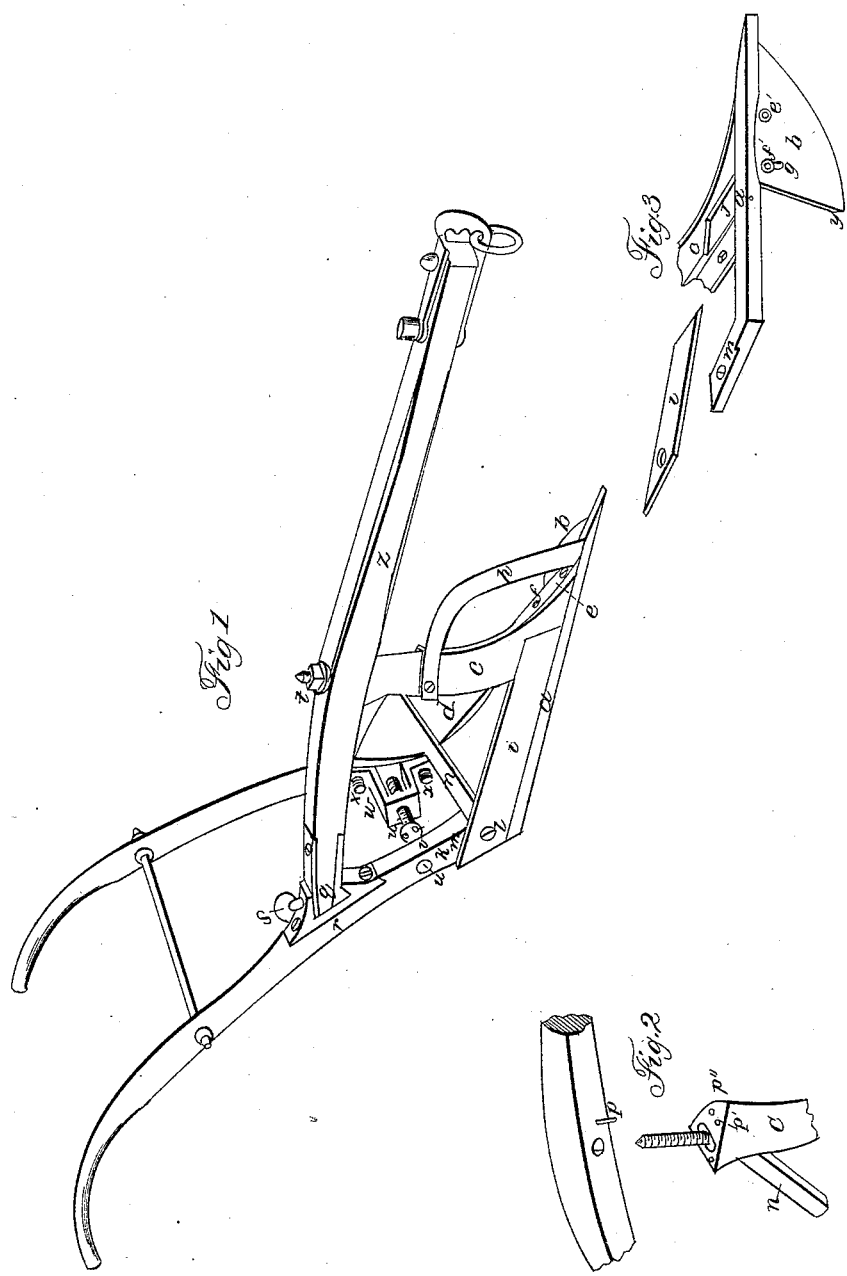

UNITED STATES PATENT OFFICE.

ROBERT A. GRAHAM, OF NEW PARIS, OHIO.

IMPROVEMENT IN PLOWS.

Specification forming part of Letters Patent No. 10,069, dated October 4, 1853.

*To all whom it may concern:*

Be it known that I, ROBERT A. GRAHAM, of New Paris, in the county of Preble and State of Ohio, have invented new and useful Improvements in Plows; and I do hereby declare the following to be a full, clear, and exact description thereof, reference being had to the annexed drawings, making part of this specification.

My improvements have for their object, first, the lateral angular adjustment of the mold-board, so as to increase or diminish its flare to suit different kinds of ground, a sharp presentation of the mold-board being desirable for sod or subsoil plowing and a flaring one for trash or stubble; secondly, the lateral angular adjustment of the beam to suit the flare of the mold-board, the number and arrangement of animals in the team, and the nature of the ground, a flaring board, an additional horse, or the presence of rank vegetation or stubble, for instance, all making it requisite to place the beam "out of land," and vice versa, in order either to counteract the swerving tendencies of the mold-board or team, or, in the case of stubble, to avoid clogging the throat of the plow; thirdly, the preservation of the continuity of the plowing-surfaces during the variations in the flare of the mold-board.

In the annexed drawings, Figure 1 is a perspective view of the plow. Fig. 2 is a detached view of the joint between the beam and the sheth. Fig. 3 is a detached view of the share and its appendages, seen from below.

In the accompanying drawings, $a$ is the landside-bar, and $b$ the share, welded together in one piece. To these the sheth $c$ and mold-board $d$ are united by two bolts $e$ $f$, which, passing through the mold-board, sheth, and share, are secured below the latter by nuts $e'$ $f'$. The aperture $g$ in the share occupied by the bolt $f$ is an oblong one, concentric with the bolt $e$, so as (when the nuts are relaxed) to permit a vibration of the mold-board and sheth with respect to the share and landside.

$h$ is the colter. $i$ is the landside-plate, sharpened at its front edge, so as to occupy and be held fast by a groove or nick, $j$, in the sheth, and so as to preserve the continuity of the landside surface with every position of the mold-board.

The rear end of the landside-plate is made fast to the foot of the helve $k$ by means of the bolt $l$, which also attaches to the helve the shank $m$ of the landside-bar and the lower end of the stay-bolt $n$. This stay-bolt $n$, passing upward through a transverse slot, $o$, in the top of the shet and through the beam $z$, is bolted fast upon the upper side of the latter, a pin or dowel, $p$, upon the under side of the beam being previously inserted in one or the other of the sockets $p'$ $p''$, according to the angular position desired for the beam. The tail of the beam is not immovably fixed to the helve, but terminates in a dovetailed tenon, $q$, occupying a corresponding socket, $r$, upon the helve, and is consequently capable of lateral adjustment, so as to still further facilitate the angular transposition of the beam. The beam being (by means of the shifting attachments to the sheth and helve) brought to the desired direction, is retained thereto by the tightening of the screw $s$ and nut $t$.

The flare of the mold-board is increased or diminished by means of the screw-bolt $u$, having its head $u'$ held fast, but permitted to rotate in the helve by a pin, $v$, and being tapped into a nut, $w$, fastened to the lower end of the second handle by means of the same bolts, $x$, which attach the rear corner of the mold-board.

The upper edge of the share constitutes a lip, $y$, which, having at its upper side a horizontal chamfer nicely fitted to the lower edge of the mold-board, affords a continuous surface when the angle of the plow is contracted.

What I claim herein as new, and desire to secure by Letters Patent, is—

1. The screw-bolt $u$, or its equivalent, for setting out or in the rear edge of the mold-board with respect to the landside, acting in combination with the bolts $e$ and $f$, which, being tightened, attach to each other the mold-board, sheth, and lipped or flanged share, as described, and which bolts, being temporarily relaxed, permit the vibration of the mold-board about the bolt *e* without interrupting the continuity of plowing-surface or disconnecting the several parts.

2. The shifting or adjustable socket attachment of the beam to the sheth, in combination with the dovetailed and adjustable connection of the rear end of the beam to the helve, or equivalent devices, so as to vary the direction of the draft of the plow to suit the requirement of a change in the flare of the mold-board, and other objects, as herein explained.

In testimony whereof I have hereunto set my hand before two subscribing witnesses.

R. A. GRAHAM.

Witnesses:
  EDWARD H. KNIGHT,
  JACOB REINHEIMER.